(12) United States Patent
Usui (10) Patent No.: US 10,140,211 B2
(45) Date of Patent: Nov. 27, 2018

(54) CACHE DEVICE AND METHOD FOR STORING TAG DATA AND CACHE DATA IN CACHE DEVICE

(71) Applicant: Toshiba Memory Corporation, Minato-ku, Tokyo (JP)

(72) Inventor: Hiroyuki Usui, Kawasaki, Kanagawa (JP)

(73) Assignee: Toshiba Memory Corporation, Tokyo (JP)

(*) Notice: Subject to any disclaimer, the term of this patent is extended or adjusted under 35 U.S.C. 154(b) by 154 days.

(21) Appl. No.: 15/392,185

(22) Filed: Dec. 28, 2016

(65) Prior Publication Data

US 2018/0004669 A1 Jan. 4, 2018

Related U.S. Application Data

(60) Provisional application No. 62/356,792, filed on Jun. 30, 2016.

(51) Int. Cl.
| | | |
|---|---|---|
| G06F 12/00 | (2006.01) | |
| G06F 12/0853 | (2016.01) | |
| G06F 12/0811 | (2016.01) | |
| G06F 12/0895 | (2016.01) | |
| G06F 12/0897 | (2016.01) | |
| G06F 12/0831 | (2016.01) | |

(52) U.S. Cl.
CPC ...... G06F 12/0853 (2013.01); G06F 12/0811 (2013.01); G06F 12/0895 (2013.01); G06F 12/0897 (2013.01); *G06F 12/0831* (2013.01); *G06F 2212/283* (2013.01)

(58) Field of Classification Search
None
See application file for complete search history.

(56) References Cited

U.S. PATENT DOCUMENTS

| | | | |
|---|---|---|---|
| 5,651,135 A | 7/1997 | Hatakeyama | |
| 6,640,283 B2 | 10/2003 | Naffziger et al. | |
| 7,702,857 B2 * | 4/2010 | Gill | G06F 12/0862 711/137 |
| 2017/0255562 A1 | 9/2017 | Usui et al. | |

FOREIGN PATENT DOCUMENTS

JP 5434646 B2 3/2014

* cited by examiner

*Primary Examiner* — Brian Peugh
(74) *Attorney, Agent, or Firm* — White & Case LLP (57) ABSTRACT

A cache device of an embodiment includes a tag/data memory. The tag/data memory includes a storage area capable of storing a plurality of pieces of tag data and a plurality of pieces of compressed cache data corresponding to the plurality of pieces of tag data; and each of the pieces of tag data includes a flag indicating whether the piece of tag data is a piece of tag data read last or not and a compression information field C indicating whether each of the pieces of cache data is compressed or not.

20 Claims, 10 Drawing Sheets

Set0 | Tag0 | Tag1 | Tag2 | Tag3 | Tag4 | Tag5 | Tag6 | Tag7 | Tag8 | Tag9 | Tag10 | Tag11 | Tag12 | Tag13 | Tag14 ← ma0

CACHE DEVICE AND METHOD FOR STORING TAG DATA AND CACHE DATA IN CACHE DEVICE

CROSS-REFERENCE TO RELATED APPLICATIONS

This application is based upon and claims the benefit of priority from U.S. Provisional Application No. 62/356,792, filed on Jun. 30, 2016; the entire contents of which are incorporated herein by reference.

FIELD

An embodiment described herein relates generally to a cache device and a method for storing tag data and cache data in the cache device.

BACKGROUND

Generally, processing speed of a processor (for example, a central processing unit (CPU)) and a hardware engine (HWE) is higher than data supply speed of a main memory such as a DRAM. Therefore, there may be a case where a cache memory to make up for the performance difference is used.

As the cache memory, an SRAM or the like faster than the main memory is used, and data on the main memory is temporarily stored in the cache memory.

If the cache memory does not exist, the processor acquires data corresponding to a data size to be accessed at a time (for example 4 bytes) from the main memory. If the cache memory exists but there is not data on a data array of the cache memory, the cache memory acquires data with a line size larger than the data size to be accessed (for example, 256 bytes) from the main memory.

On the other hand, if the requested data exists in the cache memory, the cache memory can return the data to the processor from the cache memory without acquiring the data from the main memory. Therefore, the processor or the hardware engine can access data at a high speed.

Since capacity of implementation of the cache memory is limited, it has been conventionally proposed to compress to store data. The cache memory is operated in line sizes. When handing over data to the processor, the compression cache memory extends a cache line including the requested data and returns the requested data from the cache line.

In a conventional compression cache memory, a size of a tag memory is a fixed-length size, and the number of pieces of tag data corresponding to the number of ways is stored in the tag memory. However, though a size of each piece of data is compressed and reduced, the size may be reduced more than an assumed compression ratio depending on a value of the data.

In the conventional compression cache memory, even if data is compressed at a ratio higher than an assumed compression ratio, and there is room in a data memory, the free space cannot be used as a data storage area.

DETAILED DESCRIPTION

A cache device of an embodiment is a cache device including a tag/data memory including a storage area capable of storing a plurality of pieces of tag data and a plurality of pieces of compressed cache data corresponding to the plurality of pieces of tag data, wherein each of the pieces of tag data includes first information indicating whether the piece of tag data is a piece of tag data read last or not and second information indicating whether each of the pieces of cache data is compressed or not.

The present embodiment will be described with use of drawings.

(System Configuration)

Figure 1:
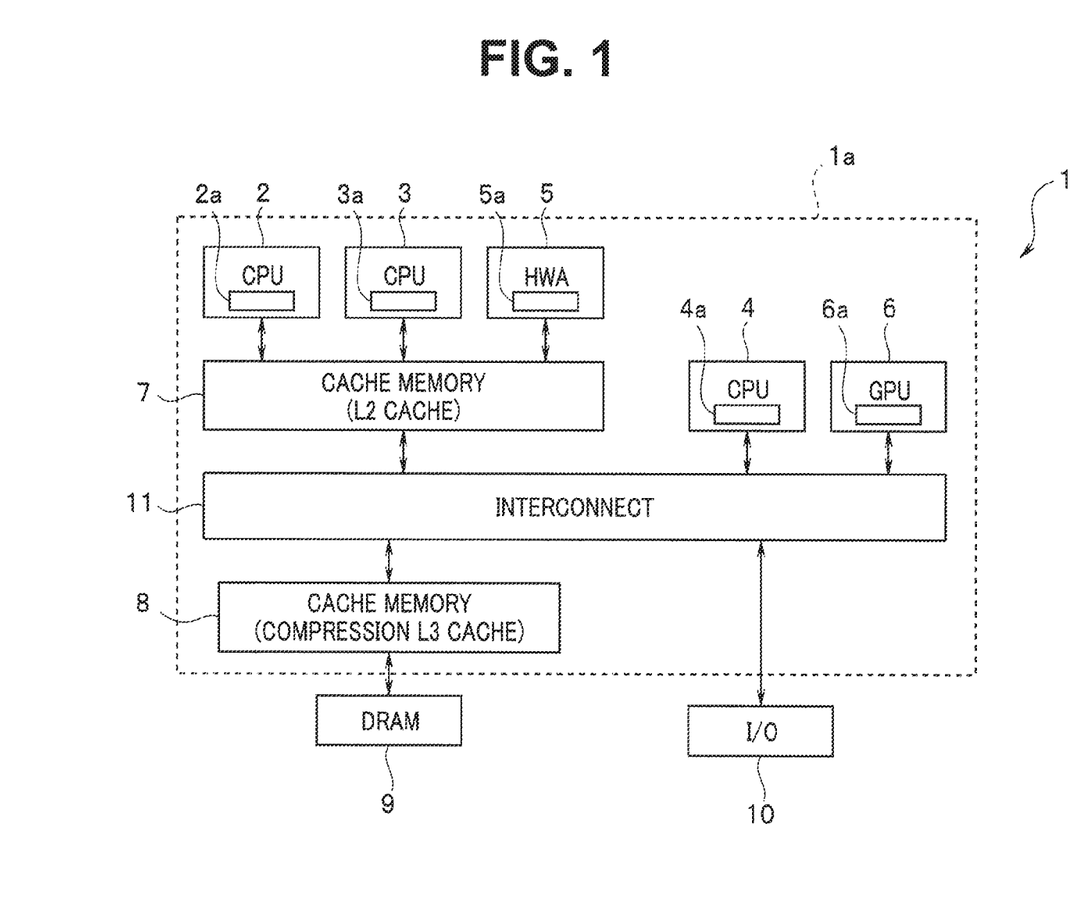
FIG. 1 is a block diagram showing a whole configuration of a computer system using a cache device according to an embodiment.

FIG. 1 is a block diagram showing a whole configuration of a computer system using a cache device according to the embodiment. For example, in FIG. 1, a range indicated by a dotted line is configured as a one-chip semiconductor device 1a.

A computer system 1 is configured including a plurality of central processing units (hereinafter referred to as CPUs) 2, 3, 4, a hardware accelerator (hereinafter abbreviated as an HWA) 5, a graphics processing unit (hereinafter abbreviated as a GPU) 6, cache memories 7, 8, a DRAM 9, an input/output interface (hereinafter abbreviated as an I/O) 10 and an interconnect 11.

The CPU 2, the CPU 3 and the HWA 5, which are master devices, share a cache memory 7 which is an L2 cache. The cache memory 7 is connected to the interconnect 11 such as a bus.

The CPU 4 and the GPU 6 exchange data with the DRAM 9, which is a main memory, via the interconnect 11.

The CPUs 2, 3, 4, the HWA 5 and the GPU 6 include dedicated L1 cache memories 2a, 3a, 4a, 5a, 6a, respectively.

The cache memory 7 exchanges data with the DRAM 9, which is the main memory, via the interconnect 11.

The DRAM 9 is connected to the interconnect 11 via a cache memory 8 which is an L3 cache. The I/O 10 is also connected to the interconnect 11.

The cache memory 8 is a cache device configured to hold compressed data. Therefore, the cache memory 8 has a circuit configured to perform compression and decompression of data inside.

Further, the computer system 1 is mounted with a cache coherence system for keeping consistency between the main memory and the cache memories.

Note that the cache memory 8 may be arranged between the cache memory 7 and the interconnect 11 or may be arranged as an L2 cache instead of the cache memory 7.

Furthermore, note that it is also conceivable that any or a part of the CPUs 2, 3, 4, the HWA 5 and the GPU 6 do not have an L1 cache memory, the computer system 1 does not have the cache memory 7, and the cache memory 8 is an L1 cache memory.

(Configuration of Compression Cache)

Figure 2:
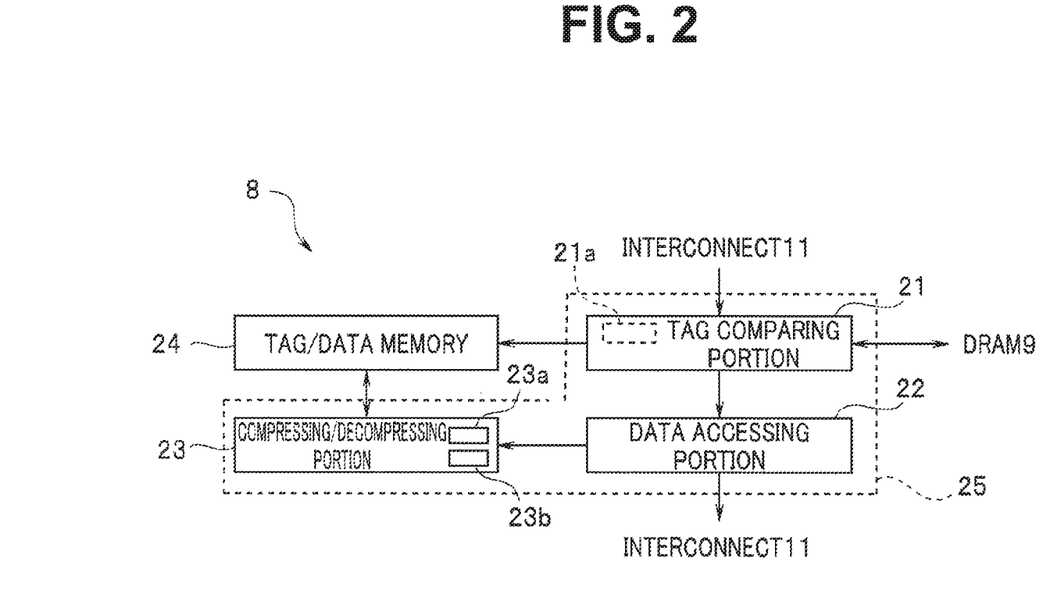
FIG. 2 is a block diagram showing a schematic configuration of a cache memory 8 according to the embodiment.

FIG. 2 is a block diagram showing a schematic configuration of the cache memory 8. The cache memory 8 is configured with a tag comparing portion 21, a data accessing portion 22, a compressing/decompressing portion 23 and a tag/data memory 24. The tag comparing portion 21, the data accessing portion 22 and the compressing/decompressing portion 23 constitute a controlling portion 25. Each portion is configured with a hardware circuit.

The tag/data memory 24 stores tag data of cache lines and compressed cache data.

The tag comparing portion 21 compares tag data of an address related to a read request or a write request received from a master apparatus such as the CPU 2 with tag data read from the tag/data memory 24 and judges whether a cache miss or a cache hit. Further, when access occurs, the controlling portion 25 controls reading and writing of data from and to the tag/data memory 24.

The tag comparing portion 21 has fixed-length registers configured to store a predetermined number of pieces of tag data.

When the tag comparing portion 21 makes a cache hit judgment, the data accessing portion 22 accesses the tag/data memory 24 via the compressing/decompressing portion 23.

The compressing/decompressing portion 23 includes a compressor 23a and a decompressor 23b. The compressor 23a compresses cache data and writes the cache data to the tag/data memory 24, and the decompressor 23b decompresses the cache data read from the tag/data memory 24 and outputs the cache data to the data accessing portion 22.

In a case of a read request, since the cache data read from the tag/data memory 24 is compressed, the cache data is restored to original data by the decompressor 23b. The data accessing portion 22 returns the restored original data to a request source.

Further, in a case of a write request, write-target cache data is read from the tag/data memory 24, and the read data is decompressed and restored to original data by the decompressor 23b. The data accessing portion 22 performs writing to the restored original data, compresses the data by the compressor 23a and stores the data into the tag/data memory 24.

When the tag comparing portion 21 makes a cache miss judgment, the tag comparing portion 21 reads requested data from the DRAM 9. The read data is compressed by the compressor 23a and written into the tag/data memory 24.

At this time, if it is necessary to evict a cache line already held in the tag/data memory 24, the tag comparing portion 21 decompresses data of the cache line to be evicted, by the decompressor 23b, and writes the data to the DRAM 9. Simultaneously, tag data in the tag/data memory 24 is also updated.

(Configuration of Tag/Data Memory)

Figure 3:
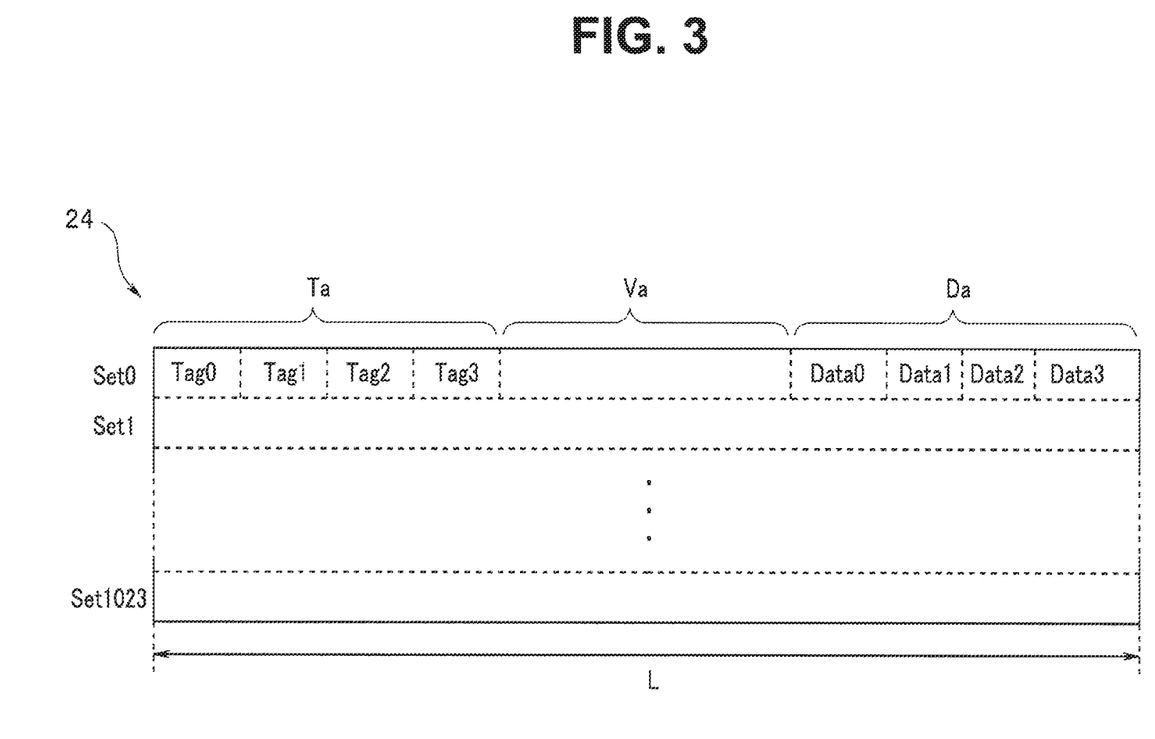
FIG. 3 is a diagram showing a data structure of a tag/data memory 24 according to the embodiment.

FIG. 3 is a diagram showing a data structure of the tag/data memory 24. The tag/data memory 24 is, for example, an N-way set associative compression cache and is capable of storing a plurality of sets of data. Here, N is a positive integer. Note that, in the description of the present embodiment, an assumed data compression ratio is 50%. There may be a case where data is compressed at a ratio higher than the compression ratio.

Each set has a storage area ma with a size L in which n pieces of tag data and n pieces of compressed cache data can be stored when the data is compressed with the assumed compression ratio (50%). Here, n is a positive integer. Note that a set is an identifier to be used for identifying a data area used in a memory space.

In FIG. 3, the tag/data memory 24 has 1,024 sets Set0 to Set1023.

For example, when each piece of cache data is compressed to 50%, which is the assumed compression ratio, in a case of n=5, the tag/data memory 24 has, for each set, at least a storage area of a size capable of storing five pieces of cache data compressed to 50% and five pieces of tag data.

Further, when data is compressed at a ratio higher than the assumed compression rate (for example, 25%), the tag/data memory 24 can store, for each set, the number of pieces of cache data larger than n and the number of pieces of tag data higher than n.

FIG. 3 shows a state in which four pieces of data are stored in Set0. The storage area ma of Set0 includes a cache data storage area Da storing pieces of cache data Data0 to Data3, a tag data storage area Ta storing pieces of tag data Tag0 to Tag3 related to the pieces of cache data, and a free space Va.

Each piece of tag data has a predetermined fixed size. That is, data lengths of the respective pieces of tag data are constant. However, when being compressed, cache data may be compressed at a ratio higher than the assumed compression ratio depending on a value of the data, and there may be a case where the data length is shorter than 50%. Therefore, a size of the free space Va changes depending on an actual compression ratio.

The pieces of tag data are gathered and stored, for example, on an upper bit side of the storage area ma, and the pieces of cache data are gathered and stored on a lower bit side of the storage area ma.

In the present embodiment, the number of pieces of tag data and an amount of cache data stored for each set are increased to an extent that storage of the pieces of data is possible so that the free space Va is reduced.

Figure 4:
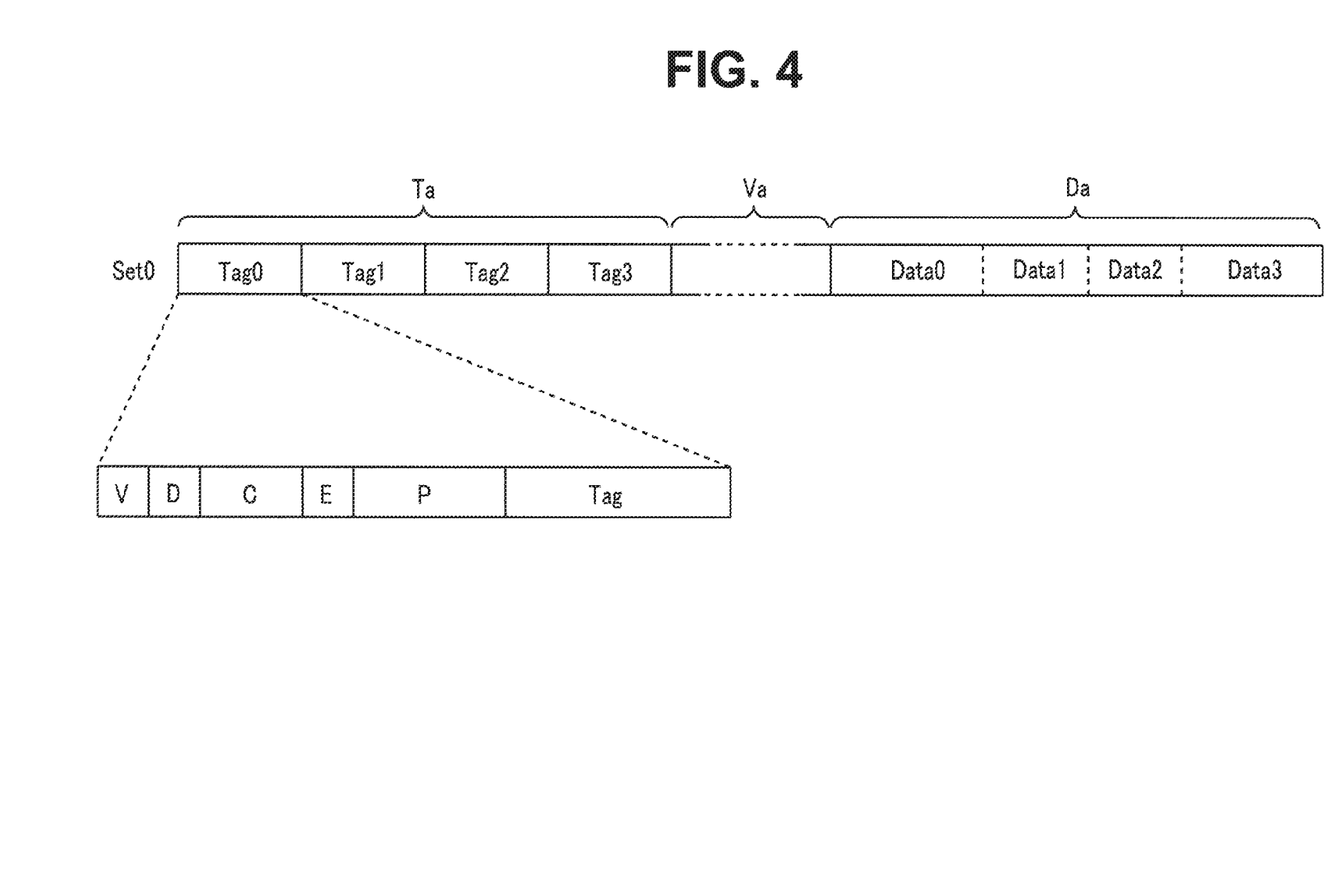
FIG. 4 is a diagram showing an example of the data structure of the tag/data memory 24 according to the embodiment.

FIG. 4 is a diagram showing an example of the data structure of the tag/data memory 24. FIG. 4 shows that compressed pieces of cache data Data0 to Data3 are stored in the data storage area Da corresponding to Set0. The pieces of tag data Tag0 to Tag3 are stored in the tag data storage area Ta.

A piece of tag data has a list structure. Each piece of tag data includes a plurality of state flags showing various states, a compression information field C (compress), an end flag E (end), data position information P (position) and tag information (tag). The end flag E indicates whether tag data is last tag data or not.

The state flags are bit data including a flag V (valid) indicating whether the cache line is effective or not and a flag D (dirty) indicating whether cache line is modified or not. Each of the flags V and D is one-bit data.

The compression information field C is one-bit data indicating compression/non-compression of cache data. Otherwise, in a case where a plurality of compression schemes can be selected, the compression information field C is multi-bit data indicating a compression scheme. That is, the compression information field C is information indicating whether corresponding cache data Data is compressed or not.

The end flag E is one-bit data indicating whether tag data is last tag data in the set or not. Since a piece of tag data has a list structure, it is possible to read pieces of tag data from a first piece of data in predetermined order. When the end flag E is a predetermined value (here, "0"), it means being a last piece of data.

For example, when four pieces of data are stored in a certain set, 0 is set to the end flag E of a piece of tag data related to a fourth piece of data. That the end flag E is 1 indicates that there is a next piece of tag data. In the cache memory 8, when it is judged whether or not there is data related to access, one or more pieces of tag data are read in order. If a cache hit does not occur, tag data reading is performed until there is not a next piece of tag data any more.

The data position information P indicates a position of a piece of cache data related to a piece of tag data concerned.

The tag information is address data.

Though each of the pieces of cache data Data0 to Data3 are shown as variable-length data in FIGS. 3 and 4, each piece of cache data is stored in fixed-length units in the present embodiment. That is, the cache data storage area Da is managed in divided fixed-length units. The data position information P is configured with a plurality of bits in the bitmap format indicating storage positions of a plurality of pieces of data divided in the fixed lengths.

Figure 5:
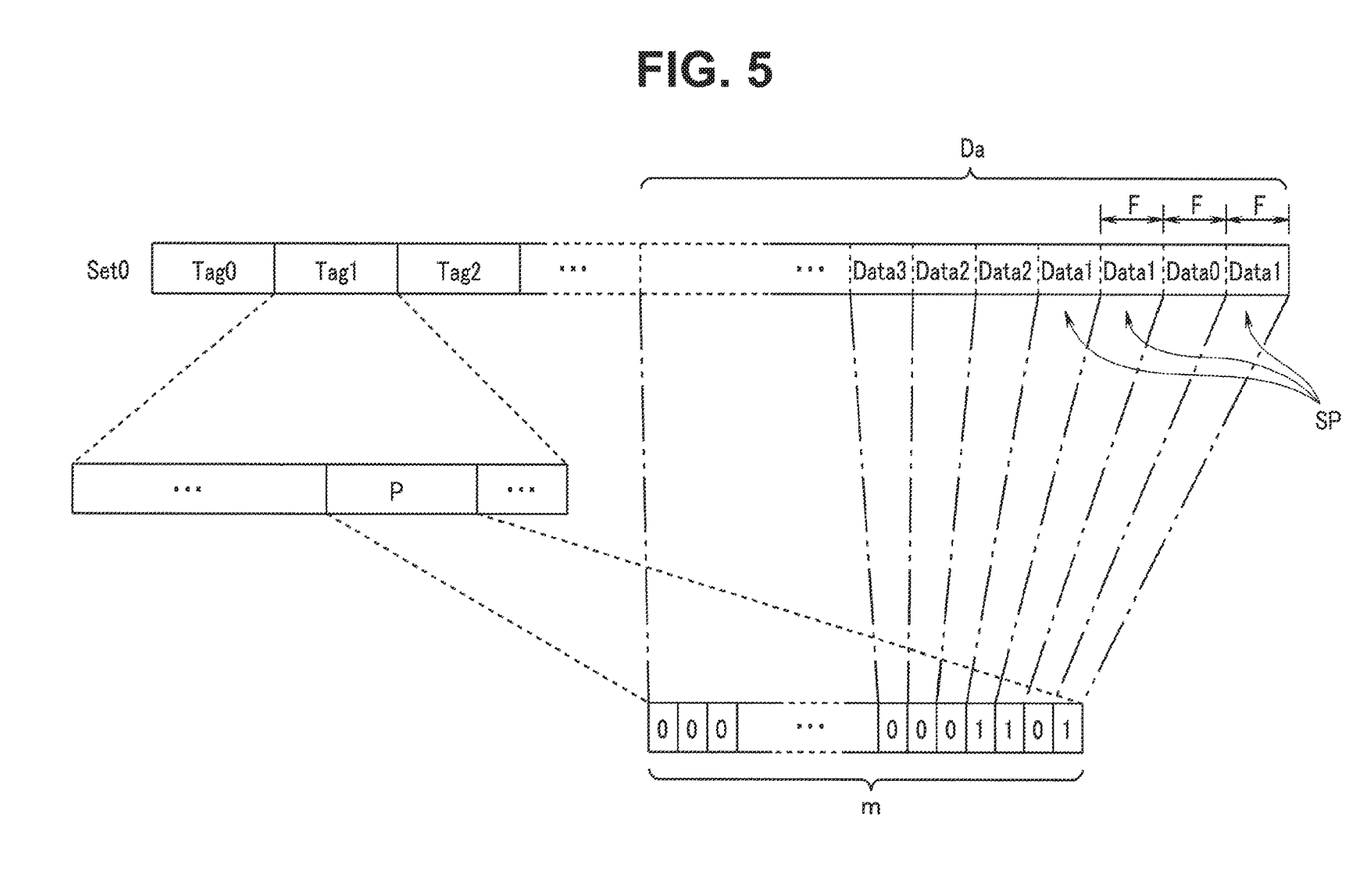
FIG. 5 is a diagram for illustrating a data structure of data position information P according to the embodiment.

FIG. 5 is a diagram for illustrating a data structure of the data position information P. FIG. 5 shows the data position information P about tag data Tag1 of Set0.

Each piece of cache data is managed by the tag comparing portion 21 as data in fixed-length units.

A total amount of cache data that can be stored in each set is determined in advance. The data storage area Da having the total amount of data is constituted by m fixed lengths F. Here, m is a positive integer equal to or larger than 2. That is, in each set, m divided areas each of which has a predetermined fixed length F are specified in the data storage area Da corresponding to the total amount of data.

The data position information P is an m-bit string.

Bit positions in the data position information P are associated with positions of the divided areas in the data storage area Da in advance, respectively, as indicated by two-dot chain lines in FIG. 5. Therefore, all or a part of a piece of cache data related to a piece of tag data concerned is stored at positions of divided areas corresponding to "1" in the data position information P.

A piece of cache data Data1 related to the piece of tag data Tag1 shown in FIG. 5 is shown being divided in three. In FIG. 5, first, third and fourth bits from a right end in the data position information P are "1".

As described above, each piece of cache data is divided in fixed lengths and stored in the tag/data memory 24. Each piece of tag data includes the data position information P indicating a position of each of a plurality of divided areas in the storage area ma. Note that a data configuration of the data position information P may not be in the bitmap format.

Further, each piece of cache data may be managed in variable-length data units.

Next, an operation of the cache memory 8 will be described with use of drawings.

Figure 6:
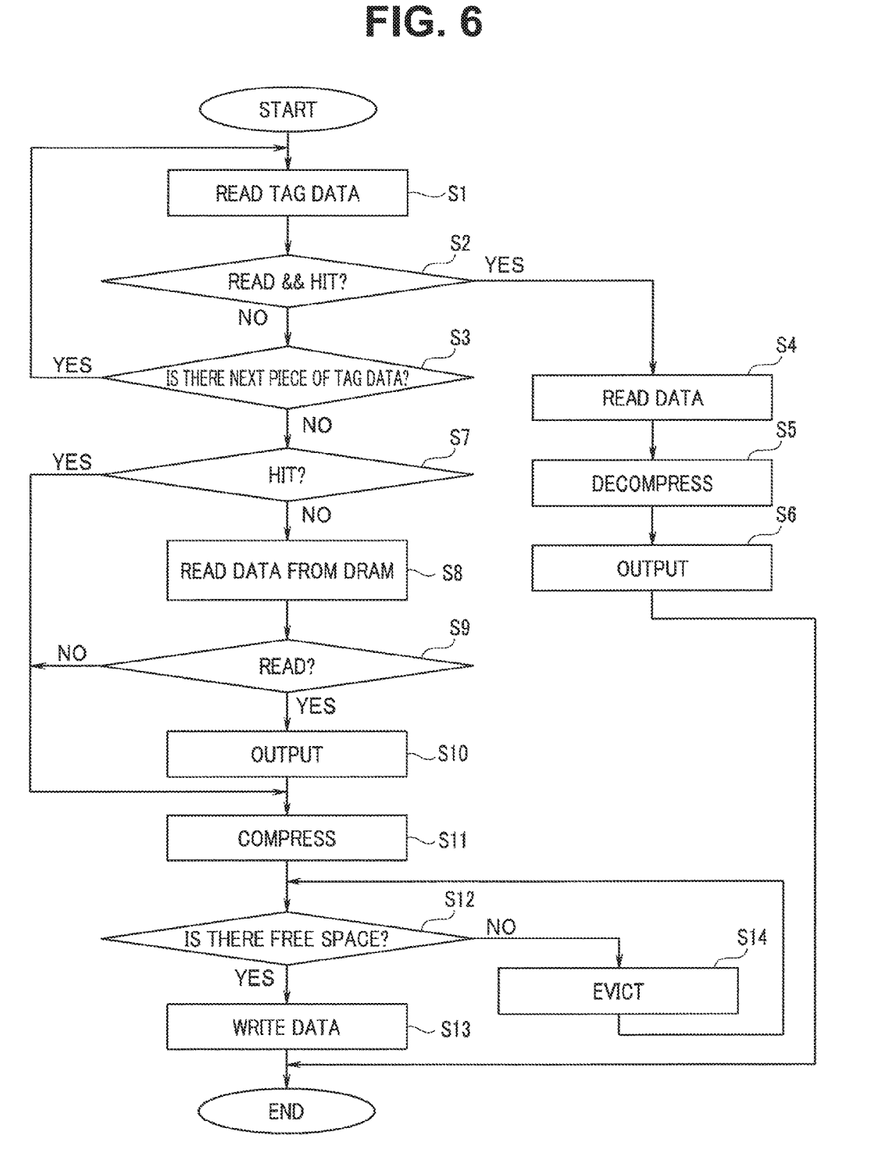
FIG. 6 is a flowchart showing a process of the cache memory 8 when data access occurs, according to the embodiment.
Figure 7:
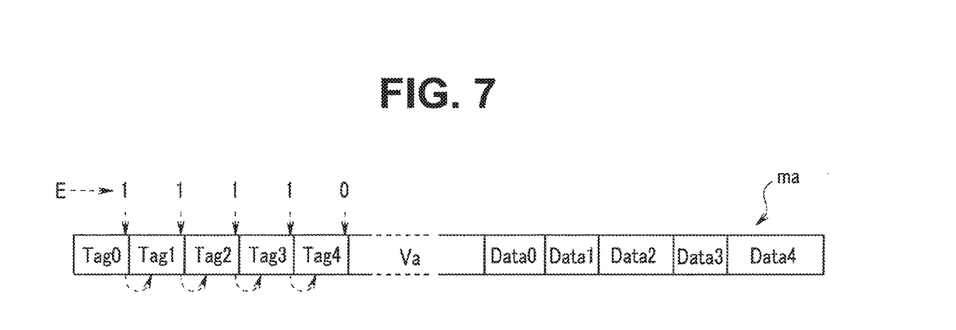
FIG. 7 is a diagram showing an example of arrangement of pieces of tag data and pieces of cache line data in a data storage area ma of a certain set, according to the embodiment.

FIG. 6 is a flowchart showing a process of the cache memory 8 when data access occurs. FIG. 7 is a diagram showing an example of arrangement of pieces of tag data and pieces of cache data in the storage area ma of a certain set. In the storage area ma shown in FIG. 7, pieces of cache data Data0 to Data4 are stored together with corresponding pieces of tag data Tag0 to Tag4. Note that, in FIG. 7, the pieces of cache data Data0 to Data4 are shown as variable-length data in order to simplify description.

When access to the cache memory 8 (a read request or a write request) occurs, the tag comparing portion 21 performs tag data reading (S1). As for a read request, the tag comparing portion 21 repeatedly performs reading of tag data in a unit of a predetermined number until a cache hit occurs or until the end flag E is read. Here, for example, it is assumed that the tag comparing portion 21 reads four pieces of tag data at a time. The tag comparing portion 21 reads the four pieces of tag data Tag0 to Tag3.

The tag comparing portion 21 judges whether or not the access is a read request and is a cache hit, based on whether or not there is a piece of tag data of data related to the access in the read pieces of tag data (S2). The tag comparing portion 21 performs comparison with the piece of tag data of the data related to the access in order from the piece of tag data Tag0.

If it is judged that the access is a read request and is not a cache hit (S2: NO), the tag comparing portion 21 judges whether or not there is still stored tag data (S3). The judgment about whether or not there is still stored tag data is performed based on whether or not there is a piece of tag data the end flag E of which is 0 in the read pieces of tag data. If there is a next piece of tag data (S3: YES), the tag comparing portion 21 returns to S1 and performs tag data reading.

In FIG. 7, all the end flags E of the pieces of tag data Tag0 to Tag3 are 1. Therefore, if the read request access is not a cache hit, the tag comparing portion 21 reads tag data which has not been read. At a second time, only the tag data Tag4 is read. Since the end flag E of the tag data Tag4 is 0, the tag comparing portion 21 can judge that there is not a next piece of tag data.

If the access is a read request and is a cache hit (S2: YES), the tag comparing portion 21 performs reading of cache data related to the access from the tag/data memory 24 (S4).

The reading of the data is performed by extracting the cache data from the data storage area Da based on the data position information P in hit tag data. The cache data is extracted from one or more divided areas corresponding to "1" in the data position information P.

The controlling portion 25 decompresses the read data by the decompressor 23*b* (S5) and outputs the decompressed data from the data accessing portion 22 to an access source (S6).

If the access is not a cache hit for the read request (S3: NO), it is judged whether or not there is tag data which is cache-hit, among the pieces of tag data read by the tag data reading (S1) (S7).

In a case of a cache miss (S7: NO), the tag comparing portion 21 reads data from the DRAM 9 (S8).

The tag comparing portion 21 judges whether the access is a read request or not (S9). In the case of a read request (S9: YES), the data read from the DRAM 9 is outputted to the access source (S10). Then, the flow proceeds to a process of S11. Note that the process of outputting the data to the access source (S10) may be performed after writing the data to the cache memory 8 (S13) to be described later.

On the other hand, if the access is not a read request (S9: NO), that is, if the access is a write request, the flow proceeds to the process of S11. Further, if the access is a cache hit and is a write request (S7: YES), the flow also proceeds to the process of S11.

Then, the controlling portion 25 compresses the data read at S8 or the data to be written by a write request, by the compressor 23a (S11). The tag comparing portion 21 judges whether or not the free space Va where the data can be stored exists in a set concerned (S12).

More specifically, the tag comparing portion 21 calculates a size of the tag data storage area Ta from the number of pieces of tag data read at S3 and calculates a size of the cache data storage area Da from the number of "1's" in the data position information P about each of the pieces of tag data. Therefore, by performing addition of the sizes of the respective pieces of tag data and cache data until a piece of tag data is read last, a data size occupying the storage area ma of the set concerned can be determined. By subtracting the data size occupying the storage ma of the set concerned from a size L, the size of the free space Va is calculated.

Since being able to judge a size of compressed data at S11, the tag comparing portion 21 can judge whether the free space Va where the data can be stored exists or not. If the size of the free space Va is equal to or larger than a total value of the size of the compressed data and the tag data size, it is judged that the free space Va to store the data exists.

If the free space Va where the data can be stored exists (S12: YES), the tag comparing portion 21 writes the data into the free space Va (S13).

Figure 8:
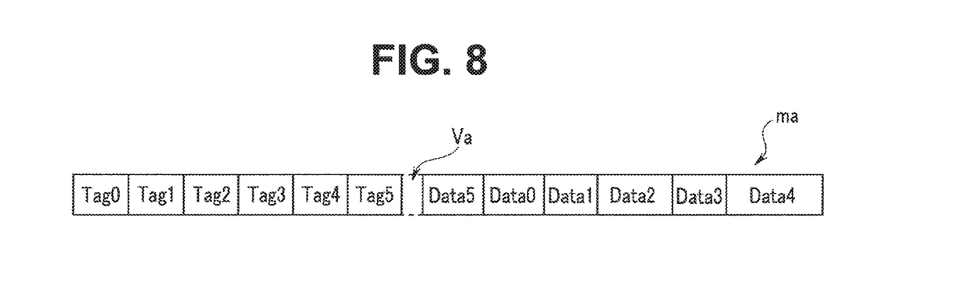
FIG. 8 is a diagram showing a data arrangement example when a piece of cache data Data5 and a corresponding piece of tag data Tag5 are added and stored in a state of FIG. 7, according to the embodiment.

FIG. 8 is a diagram showing a data arrangement example when a piece of cache data Data5 and a corresponding piece of tag data Tag5 are added and stored in a state of FIG. 7. Note that, in FIG. 8, pieces of cache data are shown as variable-length data in order to simplify description.

FIG. 8 shows that there is a slight free space Va.

The tag comparing portion 21 stores the piece of tag data Tag5 including various pieces of information and the piece of cache data Data5 into the storage area ma. Since the flag E of the piece of tag data Tag5 is caused to be 0, the tag comparing portion 21 changes the flag E of the piece of tag data Tag4 to 1.

If the free space Va to store the data does not exist (S12: NO), the tag comparing portion 21 performs data eviction in accordance with a predetermined rule (S14) and judges whether the free space Va to store the data exists or not again (S12).

For example, if a total data size of the piece of tag data Tag5 and the piece of cache data Data5 exceeds the size of the free space Va in FIG. 7, any of the pieces of tag data Tag0 to Tag4 and a corresponding piece of cache data are evicted (S14). The eviction process is performed with use of a predetermined algorithm, for example, LRU (least recently used). After the eviction process, it is again judged whether the free space Va where the data can be stored exists or not (S12). If the free space Va where the data can be stored exists (S12: YES), writing of the data is performed (S13). If the free space Va where the data can be stored does not exist (S12: NO), the data eviction process is further performed (S14).

The process of S14 is repeated until an area where the data can be stored is secured.

Figure 9:
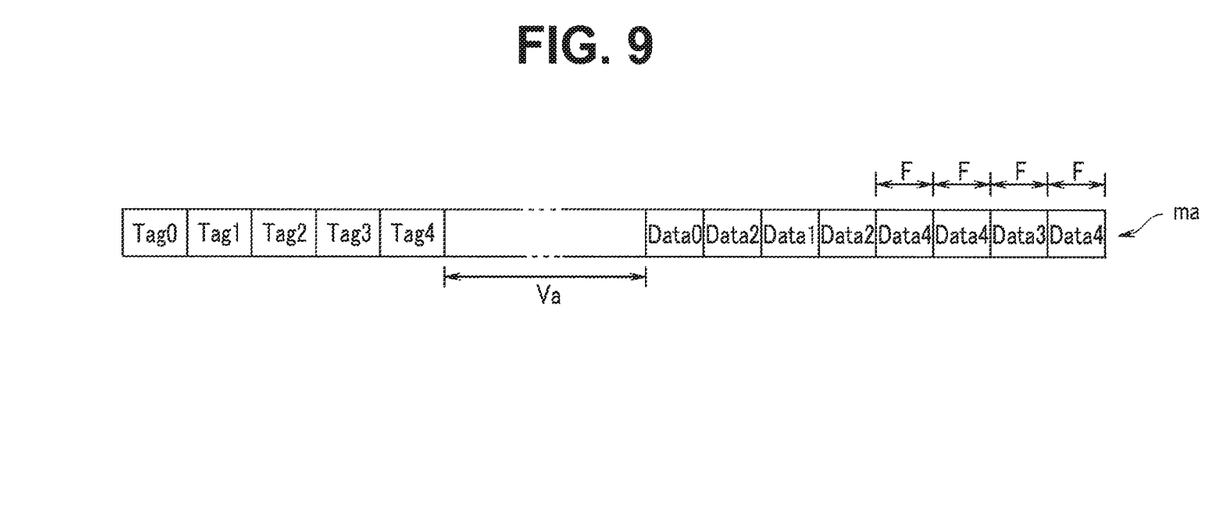
FIG. 9 is a diagram showing a data structure in a case where cache data is stored and managed in a plurality of divided areas each of which has a fixed length F, according to the embodiment.

FIG. 9 is a diagram showing a data structure in a case where cache data is stored and managed in a plurality of divided areas each of which has a fixed length F. In the storage area ma shown in FIG. 9, pieces of cache data Data0 to Data4 and corresponding pieces of tag data Tag0 to Tag4 are stored, and the storage area ma has the free space Va.

Figure 10:
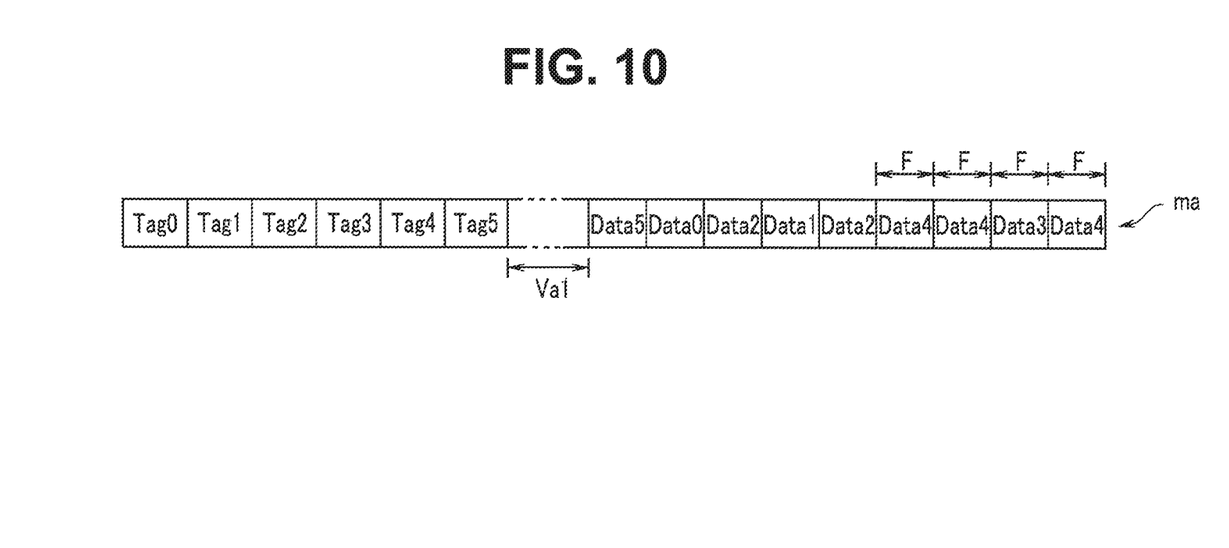
FIG. 10 is a diagram showing a data structure when a piece of cache data Data5 and a corresponding piece of tag data Tag5 are added and stored, according to the embodiment.

FIG. 10 is a diagram showing a data structure when a piece of cache data Data5 and a corresponding piece of tag data Tag5 are added and stored.

Respective pieces of cache line data Data0 to Data4 have different data lengths, and are divided and stored in a plurality of divided areas each of which has a fixed length F.

If a total size of the piece of cache data Data5 and the piece of tag data Tag5 is equal to or smaller than the free space Va, the piece of cache data Data5 and the piece of tag data Tag5 are added to and written in the storage area ma as shown in FIG. 10.

Figure 11:
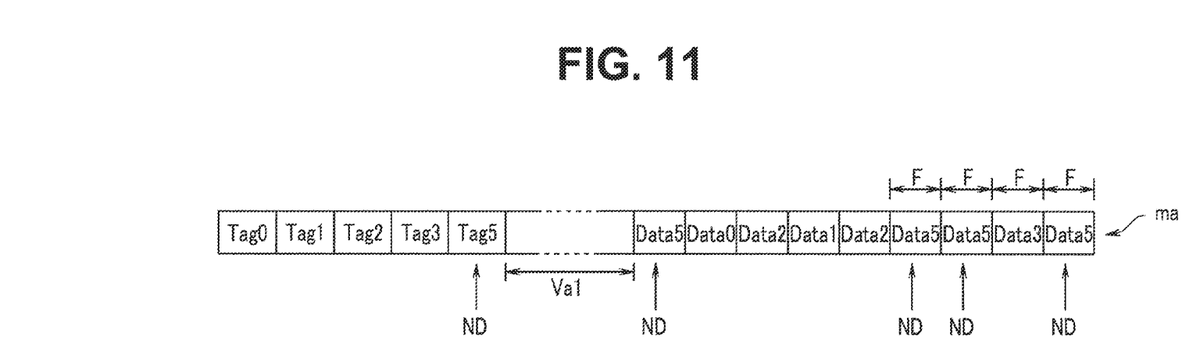
FIG. 11 is a diagram showing a data structure when existing data is evicted and new data is added and stored, according to the embodiment.

FIG. 11 is a diagram showing a data structure when existing data is evicted and new data is added and stored. FIG. 11 shows a state that the piece of cache data Data4 shown in FIG. 9 has been evicted, and a new piece of tag data Tag5 and a new cache data Data5 are stored. The piece of tag data Tag5 and the piece of cache data Data5 are stored in areas at positions indicated by ND.

As described above, if a cache miss occurs for access to the cache memory 8, the tag comparing portion 21 of the controlling portion 25 calculates the size of the free space Va in the storage area ma and judges whether or not data related to the cache miss can be stored in the free space Va.

If the data can be stored, the controlling portion 25 stores tag data and cache data related to the cache miss into the free space Va. Furthermore, if the data cannot be stored, the controlling portion 25 evicts at least one or more pairs of stored tag data and cache data from the storage area ma and stores the tag data and the cache data related to the cache miss.

As described above, in the present embodiment, tag data and of cache data are arranged in the same storage area ma for each set. The number of pairs of tag data and cache data which can be stored is variable according to the free space Va in the storage area ma. That is, associativity, which is the number of ways, is variable for each set.

Therefore, according to the present embodiment, it is possible to provide a compression cache configured to effectively utilize a free space which occurs in a memory which stores data.

Especially, when a compression ratio is high, a free space in each set decreases, and the number of pieces of tag data, that is, the associativity increases, and, therefore, a hit ratio of the compression cache is improved.

Next, modifications will be described.

(First Modification)

Figure 12:
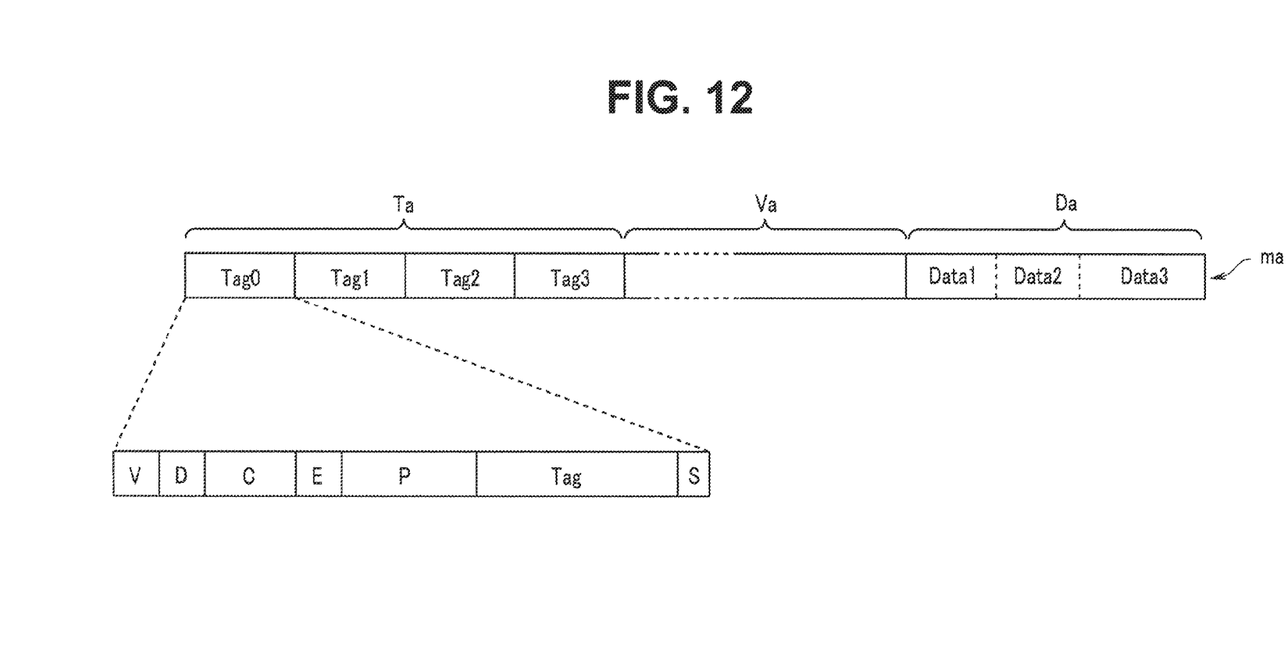
FIG. 12 is a diagram showing a data structure of the tag/data memory 24 according to a first modification of the embodiment.

In a cache memory of the present modification, when cache data is a particular value, only tag data is stored in a tag/data memory 24. In the present modification, by including information indicating that cache data is a particular value into tag data, the cache data is not stored in the tag/data memory 24.

FIG. 12 is a diagram showing a data structure of the tag/data memory 24 according to the first modification. FIG. 12 shows that tag data includes a flag S, which is information indicating whether cache data is a particular value or not. For example, if the flag S is 1, it means that the cache data is a particular value; and, if the flag S is 0, it means that the cache data is not the particular value.

When cache data is a particular value, for example, when all the cache data is constituted by 0's or 1's, the cache data is not stored into the tag/data memory 24. For example, a fixed value may be specified as the particular value at time of designing, or the particular value may be designed so as to be stored in a memory 21a included in the tag comparing portion 21 and so that it is changeable. The memory 21a is indicated by a broken line in FIG. 2. In the present example, the particular value is stored in the memory 21a.

When the flag S of tag data which is cache-hit shows that the tag data is a particular value, the tag comparing portion 21 reads data stored in the memory 21a and transmits the data to an access source.

According to the present modification, if it often happens that cache data is a particular value, more data can be stored in the storage area.

Figure 13:
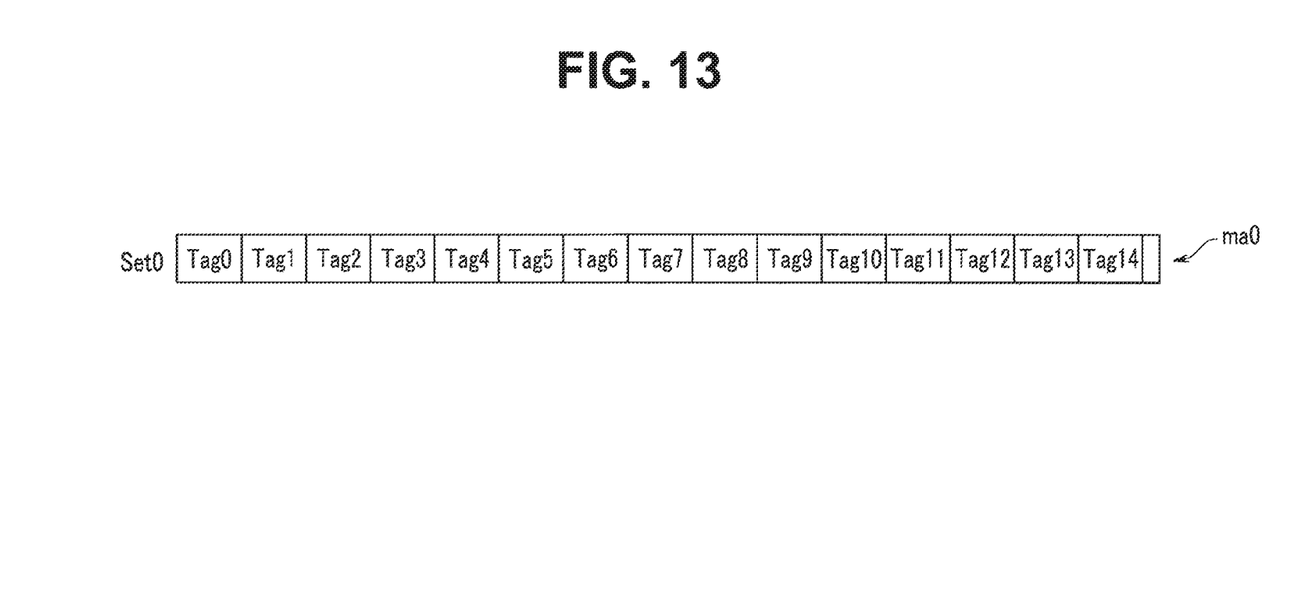
FIG. 13 is a diagram showing an arrangement example in which all data stored in Set0 is tag data, according to the first modification of the embodiment.

FIG. 13 is a diagram showing an arrangement example in which all data stored in Set0 is tag data. That is, in a case of FIG. 13, since all the flags S in respective pieces of tag data are 1, cache data is not stored, and only the fifteen pieces of tag data are stored.

When access is a read request, and the flag S in cache-hit tag data is 1, the tag comparing portion 21 transmits data stored in the memory 21a to an access source without reading cache data from the tag/data memory 24.

When access is a write request, and received cache data is a particular value, the tag comparing portion 21 does not write the cache data into the tag/data memory 24 but writes only tag data the flag S of which is set to 1 to the tag/data memory 24.

When a cache miss occurs, and data read from the DRAM 9, which is the main memory, is the particular value, the tag comparing portion 21 writes only tag data the flag S of which is set to 1 to the tag/data memory 24.

That is, each piece of tag data includes the flag S indicating whether corresponding cache data is a particular value (for example, all the cache data is constituted by 1's or 0's) or not. The tag comparing portion 21 functions as a judging portion configured to judge whether each piece of cache data is a particular value or not, and, when the piece of cache data is the particular value, performs a process of setting the flag S to a predetermined value without storing the piece of cache data into the tag/data memory 24.

According to the present modification, more data can be stored in a cache memory, and, as a result, a cache hit ratio is improved.

(Second Modification)

Further, though the cache memory 8 of the embodiment and the first modification described above is realized by a hardware circuit, the cache memory 8 may be realized by software with use of a CPU (central processing unit), a ROM, a RAM and the like.

For example, if it does not matter that operation of the cache is slow, the cache memory 8 may be realized by software.

(Third Modification)

In the computer system 1 described above, only the cache memory 8 is a compression cache, caches at other levels such as the cache memory 7 may also be compression caches.

As described above, according to the embodiment and each modification described above, it is possible to provide a compression cache configured to effectively utilize a free space which occurs in a memory for storing data.

While certain embodiments have been described, these embodiments have been presented by way of example only, and are not intended to limit the scope of the inventions. Indeed, the novel methods and devices described herein may be embodied in a variety of other forms; furthermore, various omissions, substitutions and changes in the form of the methods and devices described herein may be made without departing from the spirit of the inventions. The accompanying claims and their equivalents are intended to cover such forms or modifications as would fall within the scope and spirit of the inventions.

What is claimed is:

1. A cache device comprising a tag/data memory including a storage area capable of storing a plurality of pieces of tag data and a plurality of pieces of compressed cache data corresponding to the plurality of pieces of tag data, wherein each of the pieces of tag data includes first information indicating whether the piece of tag data is a piece of tag data read last or not and second information indicating whether each of the pieces of cache data is compressed or not.

2. The cache device according to claim 1, further comprising:
a compressor configured to compress the pieces of cache data to be stored into the tag/data memory; and
a decompressor configured to decompress the pieces of cache data compressed and stored into the tag/data memory.

3. The cache device according to claim 1, wherein each of the pieces of tag data includes third information indicating a position of a corresponding piece of cache data in the tag/data memory.

4. The cache device according to claim 3, wherein each of the pieces of cache data is divided into fixed-length units and stored into the tag/data memory.

5. The cache device according to claim 4, wherein the third information indicates a position of each of a plurality of divided areas formed by dividing the storage area into the fixed lengths.

6. The cache device according to claim 5, wherein the third information is bitmap-formatted data.

7. The cache device according to claim 3, wherein the pieces of cache data are stored in the tag/data memory in variable-length data units.

8. The cache device according to claim 1, wherein the tag/data memory stores the pieces of tag data each of which includes fourth information indicating whether a corresponding piece of cache data is a particular value or not.

9. The cache device according to claim 8, further comprising a judging portion configured to judge whether each of the pieces of cache data is the particular value or not, wherein
if the piece of cache data is the particular value, the judging portion sets the fourth information indicating that the piece of cache data is the particular value, to a corresponding piece of tag data.

10. A method for, in a cache device comprising a compressing/decompressing portion including a compressor and a decompressor, a tag/data memory capable of storing a plurality of pieces of tag data and a plurality of pieces of compressed cache data corresponding to the plurality of pieces of tag data, and a controlling portion, storing the pieces of tag data and the pieces of cache data, the method comprising:

adding first information to a piece of tag data read last when storing the pieces of tag data and the pieces of cache data into a storage area of the tag/data memory, the first information indicating that the piece of tag data read last is a last piece of tag data;

storing the pieces of cache data compressed by the compressor into the storage area;

adding second information indicating that each of the stored pieces of cache data is compressed, to a corresponding piece of tag data; and decompressing the compressed pieces of cache data by the decompressor and outputting the pieces of cache data to a master apparatus connected to the cache device.

11. The method for storing the pieces of tag data and the pieces of cache data in the cache device according to claim 10, further comprising:

if access to the cache device is a cache miss, calculating a size of a free space in the storage area, judging whether it is possible to store a piece of tag data and a piece of cache data related to the cache miss into the free space or not, and, storing the piece of tag data and the piece of cache data related to the cache miss into the free space if possible.

12. The method for storing the pieces of tag data and the pieces of cache data in the cache device according to claim 11, wherein judgment of the cache miss is performed by reading the pieces of tag data from the tag/data memory in a unit of a predetermined number and judging whether a cache hit occurs or not until the cache hit occurs or until the first information is read.

13. The method for storing the pieces of tag data and the pieces of cache data in the cache device according to claim 12, wherein calculation of the size of the free space is performed by determining a used data size by adding a size of the pieces of tag data read for the cache miss judgment and a size of pieces of cache data corresponding to the read pieces of tag data and subtracting the data size from a size of the storage area.

14. The method for storing the pieces of tag data and the pieces of cache data in the cache device according to claim 11, further comprising:

if it is not possible to store the piece of tag data and the piece of cache data related to the cache miss in the free space, evicting already stored pieces of tag data and pieces of cache data from the storage area and storing the piece of tag data and the piece of cache data related to the cache miss into a free space generated by the eviction.

15. The method for storing the pieces of tag data and the pieces of cache data in the cache device according to claim 10, wherein each of the pieces of cache data is divided into fixed-length units and stored into the tag/data memory.

16. The method for storing the pieces of tag data and the pieces of cache data in the cache device according to claim 15, wherein each of the pieces of tag data includes third information indicating a position of each of a plurality of divided areas formed by dividing the storage area by the fixed length.

17. The method for storing the pieces of tag data and the pieces of cache data in the cache device according to claim 16, wherein the free space is calculated from the third information.

18. The method for storing the pieces of tag data and the pieces of cache data in the cache device according to claim 16, wherein the third information is bitmap-formatted data.

19. The method for storing the pieces of tag data and the pieces of cache data in the cache device according to claim 10, wherein the pieces of cache line data are variable-length data.

20. The method for storing the pieces of tag data and the pieces of cache data in the cache device according to claim 10, the method further comprising:

judging whether each of the pieces of cache data is a particular value or not, and, if the piece of cache data is the particular value, performing a process of setting fourth information indicating that the piece of cache data is the particular value, to a corresponding piece of tag data without storing the piece of cache data into the tag/data memory.

* * * * *